(12) United States Patent
Malloy et al.

(10) Patent No.: US 9,336,924 B2
(45) Date of Patent: May 10, 2016

(54) SELF-WRAPPING TEXTILE SLEEVE WITH PROTECTIVE COATING AND METHOD OF CONSTRUCTION THEREOF

(71) Applicant: Federal-Mogul Powertrain, Inc., Southfield, MI (US)

(72) Inventors: Cassie Malloy, Bluebell, MI (US); Ramesh R. Avula, Phoenixville, PA (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 0 days.

(21) Appl. No.: 14/278,798

(22) Filed: May 15, 2014

(65) Prior Publication Data

US 2014/0245579 A1 Sep. 4, 2014

Related U.S. Application Data

(62) Division of application No. 12/553,231, filed on Sep. 3, 2009, now Pat. No. 8,747,582.

(60) Provisional application No. 61/094,557, filed on Sep. 5, 2008.

(51) Int. Cl.
*H01B 3/00* (2006.01)
*H01B 3/50* (2006.01)
(Continued)

(52) U.S. Cl.
CPC .............. *H01B 3/00* (2013.01); *B60R 16/0215* (2013.01); *D06B 1/10* (2013.01); *H01B 3/50* (2013.01);
(Continued)

(58) Field of Classification Search
CPC .... H01B 3/00; D07B 2201/2092; D07B 1/00; D07B 2205/2071; D07B 2401/2035; D07B 1/147; D07B 2401/2075; Y10T 428/1362; Y10T 156/10; Y10T 156/17; B60R 16/0215; G06F 1/1637; H01L 51/0097; H01L 51/56; H01L 27/3244; H01L 2251/5323; G02F 1/1303; G02F 1/133305

USPC ......................................... 156/56; 427/372.2
See application file for complete search history.

(56) References Cited

U.S. PATENT DOCUMENTS 3,913,625 A   10/1975   Gazda et al.
4,877,660 A   10/1989   Overbergh et al.
(Continued)

FOREIGN PATENT DOCUMENTS

DE   202007005375 U1   8/2007
EP       0472219 A2    2/1992
(Continued)

OTHER PUBLICATIONS

Anonymous: "Tutorial—How to apply and cure silicone coatings Typical Application Methods", Jun. 17, 2006, XP055106929, URL: http://www.dowcorning.com/content/textiles/26-1256-01a.pdf [retrieved on Mar. 11, 2014].
(Continued)

*Primary Examiner* — Jacob T Minskey
*Assistant Examiner* — Vishal I Patel
(74) *Attorney, Agent, or Firm* — Robert L. Stearns; Dickinson Wright, PLLC

(57) ABSTRACT

A self-wrapping, textile sleeve for routing and protecting elongate members from exposure to abrasion, thermal and other environmental conditions and method on construction thereof. The sleeve has an elongate wall constructed from interlaced yarns having interstices between adjacent yarns. At least one of the yarns is heat formed at one temperature to form the wall as a self-wrapping wall curling about a longitudinal axis of the sleeve. The wall has an inner surface providing a generally tubular cavity in which the elongate members are received. The wall also has an outer surface with a cured layer thereon. The cured layer is cured at the one temperature at which the yarns are heat formed into their self-wrapping configuration, wherein the cured layer fills the interstices between adjunct yarns to form an impervious layer on the wall.

8 Claims, 2 Drawing Sheets

(51) Int. Cl.
    *B60R 16/02* (2006.01)
    *H02G 3/04* (2006.01)
    *D06B 1/10* (2006.01)
    *D07B 1/00* (2006.01)
    *D07B 1/14* (2006.01)

(52) U.S. Cl.
    CPC ............. *H02G 3/0481* (2013.01); *D07B 1/00* (2013.01); *D07B 1/147* (2013.01); *D07B 2201/209* (2013.01); *D07B 2201/2084* (2013.01); *D07B 2201/2087* (2013.01); *D07B 2201/2088* (2013.01); *D07B 2201/2092* (2013.01); *D07B 2201/20903* (2015.07); *D07B 2201/20907* (2015.07); *D07B 2205/2071* (2013.01); *D07B 2401/202* (2013.01); *D07B 2401/2035* (2013.01); *D07B 2401/2075* (2013.01); *Y10T 428/1362* (2015.01)

(56) References Cited

U.S. PATENT DOCUMENTS

| | | | |
|---|---|---|---|
| 5,124,878 A * | 6/1992 | Martucci | 361/215 |
| 5,142,782 A | 9/1992 | Martucci | |
| 5,381,834 A | 1/1995 | King | |
| 5,487,861 A * | 1/1996 | Reeder et al. | 264/134 |
| 6,085,416 A | 7/2000 | Ikeda | |
| 6,334,466 B1 | 1/2002 | Jani et al. | |
| 6,390,141 B1 | 5/2002 | Fisher et al. | |
| 6,742,545 B2 | 6/2004 | Fisher et al. | |
| 2002/0195260 A1 * | 12/2002 | Marks | 174/35 R |
| 2003/0075228 A1 | 4/2003 | Tippett | |
| 2004/0034905 A1 | 2/2004 | Underwood et al. | |
| 2004/0109965 A1 | 6/2004 | Klinklin | |
| 2005/0070666 A1 * | 3/2005 | Martin | 525/191 |
| 2006/0096362 A1 | 5/2006 | Vialard | |
| 2006/0151043 A1 | 7/2006 | Nanney et al. | |
| 2007/0251595 A1 | 11/2007 | Chen | |
| 2007/0275199 A1 | 11/2007 | Chen | |
| 2008/0006432 A1 | 1/2008 | Yamaguchi | |
| 2008/0124976 A1 | 5/2008 | Rodrigues et al. | |
| 2008/0135119 A1 * | 6/2008 | Tonooka et al. | 138/110 |
| 2010/0083740 A1 | 4/2010 | Lesnau, IV | |

FOREIGN PATENT DOCUMENTS

| | | |
|---|---|---|
| EP | 0472219 A3 | 12/1992 |
| EP | 947621 A2 | 10/1999 |
| EP | 1498599 A1 | 1/2005 |
| EP | 1746324 A1 | 1/2007 |
| GB | 2139142 A | 11/1984 |
| JP | 63221031 | 9/1988 |
| JP | 01028443 B2 | 6/1989 |
| JP | 2718571 | 2/1998 |
| JP | 11-121969 A | 4/1999 |
| JP | 2006521669 A | 9/2006 |
| JP | 2008507636 | 3/2008 |
| JP | 2010512466 A | 4/2010 |
| WO | WO 9309281 | 5/1993 |
| WO | 2008070819 A2 | 6/2008 |

OTHER PUBLICATIONS

Anonymous: "Textiles and Leather—Industrial Textiles—Technical Articles—Dow Corning", Mar. 17, 2006, XP055106931, URL: http://web.archive.org/web/20060317225447/http://www.dowcorning.com/contentapps/ abstracts_index.asp?app=TechArticles & DCWS=Textiles%20and%20Leather&DCWS=Industrial%20 Textiles&Type=Technical%20Textiles&Type=Techincal%20Article [retrieved on Mar. 11, 2014].

Anonymous: "Tutorial Technical Textiles Coating—Dow Corning", Jun. 26, 2004, XP055106979, URL: http://web.archive.org/web/20040626162438/http://www.dowcorning.com/content/textiles/texind/tutorial_technical_textiles_coating.asp [retrieved on Mar. 11, 2014].

* cited by examiner

SELF-WRAPPING TEXTILE SLEEVE WITH PROTECTIVE COATING AND METHOD OF CONSTRUCTION THEREOF

CROSS-REFERENCE TO RELATED APPLICATION

This Divisional application claims the benefit of U.S. Utility application Ser. No. 12/553,231, filed Sep. 3, 2009 and U.S. Provisional Application Ser. No. 61/094,557, filed Sep. 5, 2008, which is incorporated herein by reference in its entirety.

BACKGROUND OF THE INVENTION

1. Technical Field

This invention relates generally to sleeves for protecting elongate members, and more particularly to self-wrapping textile sleeves.

2. Related Art

It is known to wrap wires and wire harnesses in protective sleeves, such as in automobiles, aircraft or aerospace craft, to provide protection to the wires against abrasion, fluid and thermal effects. In order to achieve the desired protection, the protective sleeve may have multiple layers, with some of the layers being specifically provided for different types of protection. For example, one layer may be provided for water resistance, e.g. a sheet of plastic material, while another layer may be provided for abrasion resistance, and yet another layer may be provided for protection against thermal conditions, e.g. a non-woven layer. Unfortunately, although the aforementioned multilayer sleeves may provide suitable protection against the various environmental conditions, they typically are bulky, thereby being relatively heavy and exhibiting limited flexibility. This can prove troublesome in some applications, particularly applications requiring routing through tight, winding areas, and applications having weight restrictions, such as aircraft and aerospace applications, for example. In addition, the multilayered sleeves typically come at an increased cost.

SUMMARY OF THE INVENTION

One aspect of the invention provides a self-wrapping, textile sleeve for routing and protecting elongate members from exposure to abrasion, thermal and other environmental conditions, such as exposure to fluid. The sleeve has an elongate wall constructed from interlaced yarns having interstices between adjacent yarns. At least one of the yarns is heat formed at one temperature to form the wall as a self-wrapping wall curling about a longitudinal axis of the sleeve. The wall has an inner surface providing a generally tubular cavity in which the elongate members are received. The wall also has an outer surface with a cured layer thereon. The cured layer is cured at the one temperature at which the yarns are heat formed into their self-wrapping configuration, wherein the cured layer fills the interstices between adjunct yarns to form an impervious layer to liquid on the wall.

In accordance with another aspect of the invention, a method of constructing a self-wrapping, textile sleeve for routing and protecting elongate members is provided. The method includes interlacing a plurality of yarns to form a wall having opposite outer and inner surfaces. Then, applying a liquid coating to the outer surface. Further, heat forming the wall to take on a self-wrapping configuration at one temperature with the inner surface providing a tubular cavity. Further yet, curing the liquid coating at the one temperature during the heat forming step to provide an impervious layer to fluid on the outer surface of the wall.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1A:
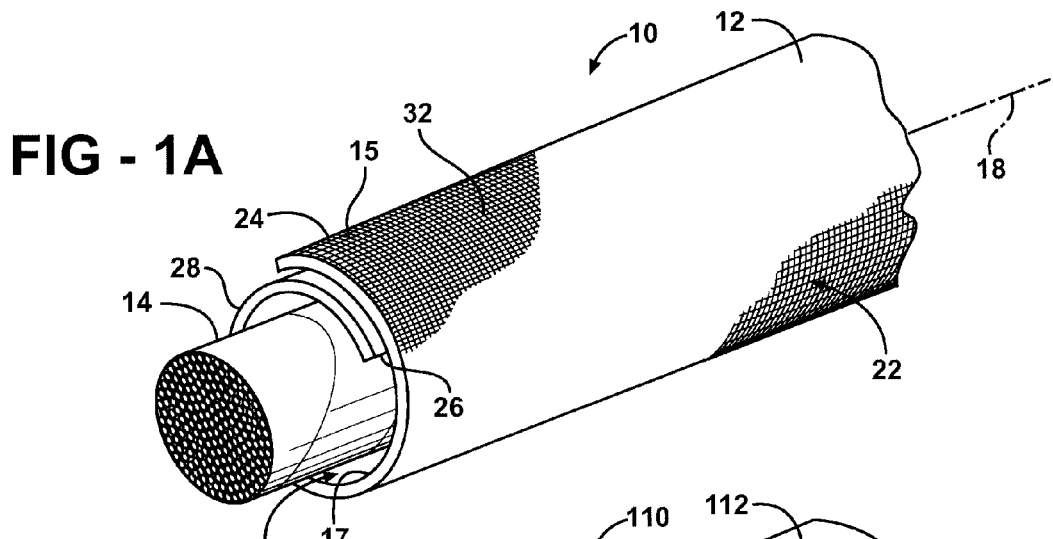
FIG. 1A is a schematic perspective partial view of a textile, self-wrapping sleeve constructed in accordance with one aspect of the invention carrying and protecting elongate members therein.
Figure 1B:
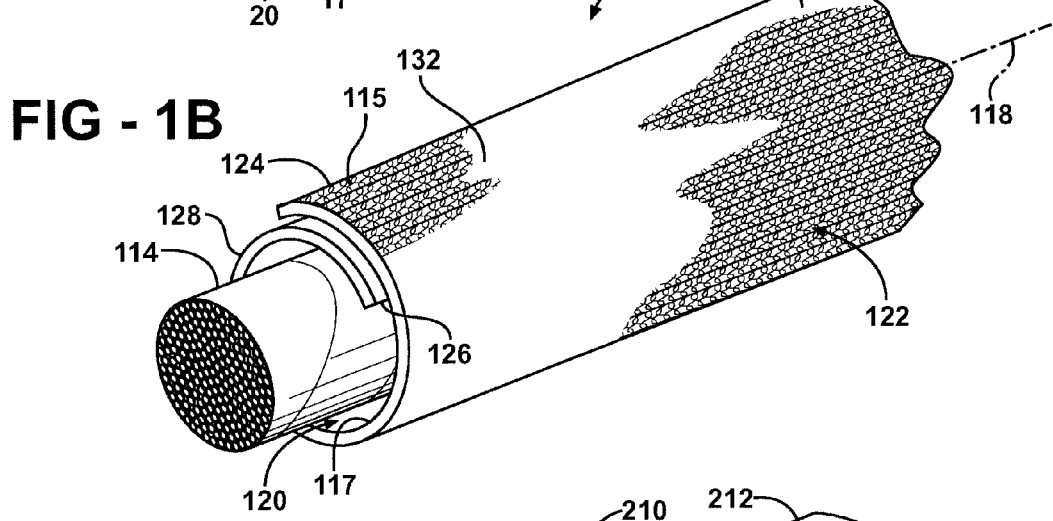
FIG. 1B is a schematic perspective partial view of a textile, self-wrapping sleeve constructed in accordance with another aspect of the invention carrying and protecting elongate members therein.
Figure 1C:
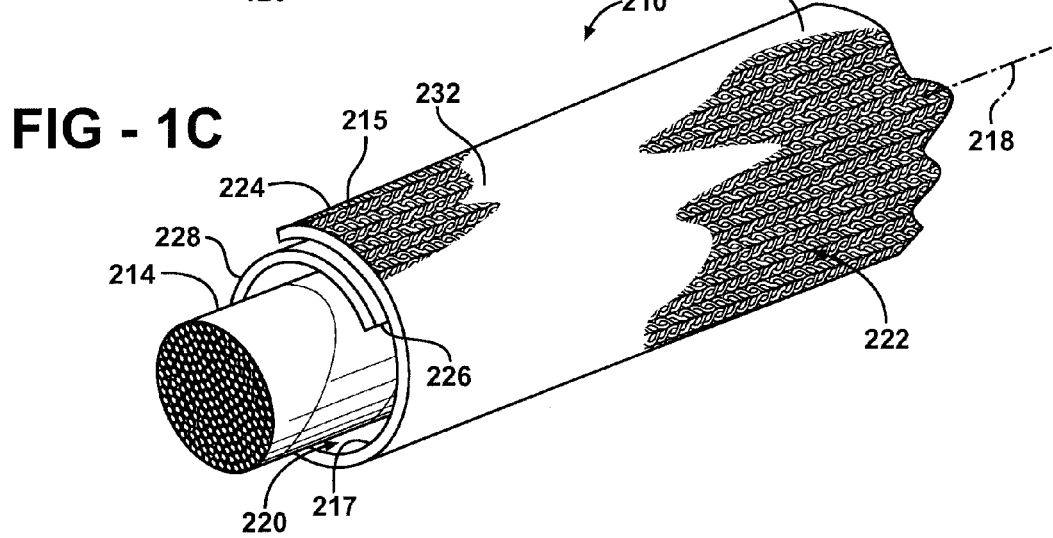
FIG. 1C is a schematic perspective partial view of a textile, self-wrapping sleeve constructed in accordance with yet another aspect of the invention carrying and protecting elongate members therein.
Figure 2:
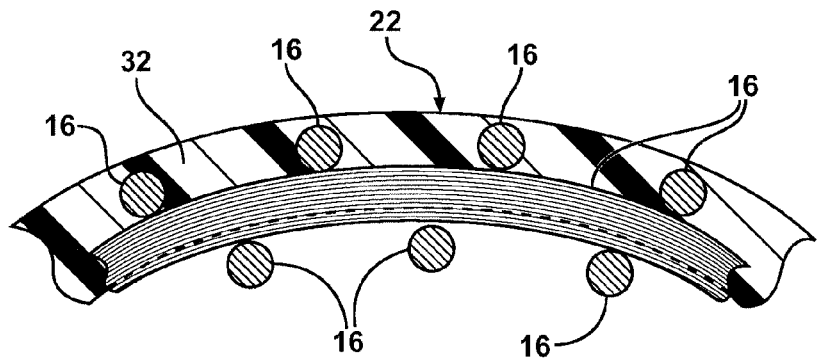
FIG. 2 is an enlarged schematic partial cross-sectional view of the sleeve of FIG. 1.

Referring in more detail to the drawings, FIG. 1 shows a schematic view of textile, self-wrapping sleeve, referred to hereafter as sleeve 10, constructed in accordance with one aspect of the invention. The sleeve 10 has a self-wrapping elongate wall 12 for routing and protecting elongate members, such as wires or a wire harness 14, for example, from exposure to abrasion, thermal and other environmental conditions, such as exposure to fluid. The elongate wall 12 has an outer surface 15 and an inner surface 17, with the wall 12 being constructed from at least one, and preferably a plurality of interlaced yarns 16. At least one of the yarns 16 is heat set to bias the wall 12 into a self-wrapping tubular configuration, wherein the inner surface 17 is self-curled about a longitudinal axis 18 to provide an enclosed tubular inner cavity 20 when the wall 12 is in its relaxed state with an external force acting to uncurl the wall 12 from its self-wrapped configuration. The cavity 20 is readily accessible along the longitudinal axis 18 of the sleeve 10 so that the elongate members 14 can be readily disposed radially into the cavity 20, and conversely, removed from the cavity 20, such as during service. To provide further protection to the elongate members 14 within the sleeve, a protective film, referred to hereafter as layer 22, is cured on the outer surface 15, as better shown in FIG. 2. The layer 22 is abrasion resistant, and provides an impervious barrier to fluid, such as water, for example. In addition, the layer 22 provides protection to the elongate members 14 against external radiant heat, up to about 200 degrees Celsius. With the protection provided by the layer 22, the thickness of the interlaced wall 12 can be minimized, whereupon the denier and/or diameter of the yarns 16 can be reduced while providing increased protection to the wires 14. For example, the denier of the yarns 16 can be 800 denier or less. Accordingly, the sleeve 10 provides enhanced protection against abrasion, heat and fluid while at the same time being economical in manufacture, and having a reduced weight.

The wall 12 can be constructed having any suitable size, including length, diameter and wall thickness. The wall 12 has opposite sides 24, 26 extending generally parallel to the axis 18 that terminate at opposite ends, with one end 28 shown. When the wall 12 is in its self-wrapped tubular configuration, generally free from any externally applied forces, the sides 24, 26 can overlap one another at least slightly to fully enclose the cavity 20 circumferentially, and thus, the wall 12 provides enhanced protection to the wires 14 contained in the cavity 20 about a full circumference of the wall 12. The sides 24, 26 are readily extendable away from one another under an externally applied force to at least partially open and expose the cavity 20. Accordingly, the wires 14 can be readily disposed into the cavity 20 during assembly or removed from the cavity 20 during service. Upon releasing the externally applied force, the sides 24, 26 return automatically under a bias imparted from being heat set to their relaxed, overlapping self-wrapped position.

The wall 12 can be constructed from multifilament and/or monofilament yarns, with at least one or more of the yarns being heat-settable. For example, one or more of the yarns 16 can be provided as a heat-settable polymeric material, such as polyphenylene sulfide (PPS), for example, which can be heat set at a temperature of about 200-225 degrees Celsius. The wall 12 can be woven (FIG. 1A), knit (FIG. 1B), or braided (FIG. 1C), from the yarns 16, as desired. As such, voids, also referred to as interstices 32, are inherently formed between adjacent yarns 16. The interstices 32 extend through the thickness of the wall 12, and thus, provide open passages from the outer surface 15 through the inner surface 17 and into the cavity 20.

Figure 2A:
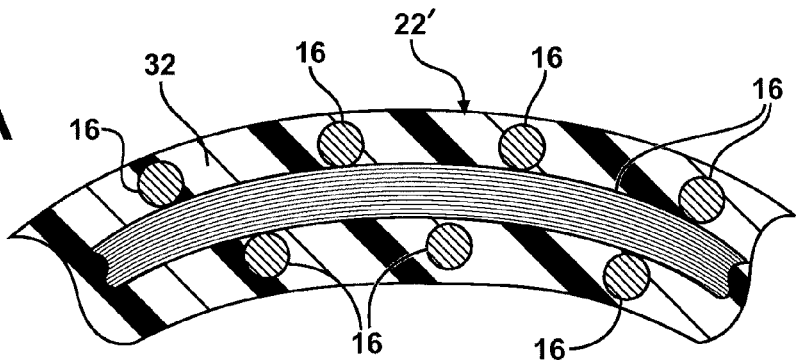
FIG. 2A is a view similar to FIG. 2 of a sleeve constructed according to another aspect of the invention.
Figure 3:
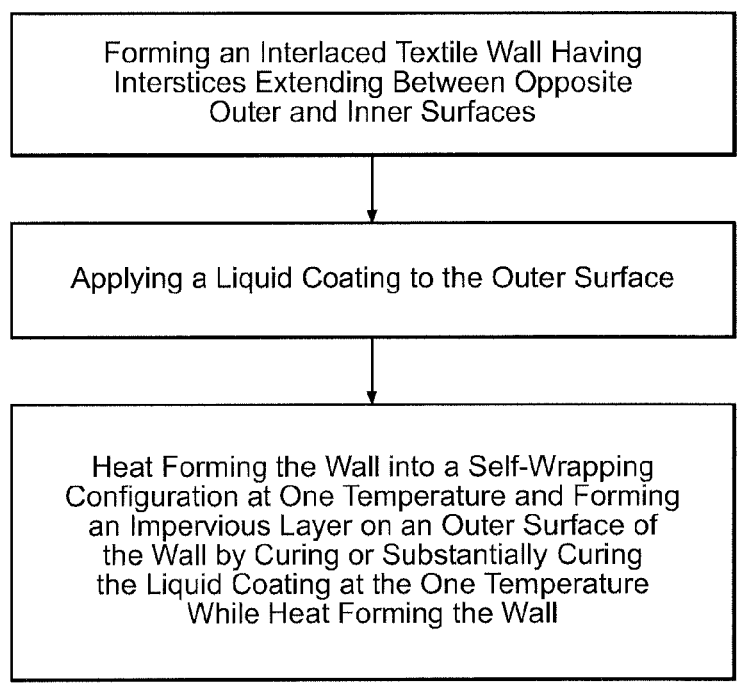
FIG. 3 is process flow diagram illustrating a method of constructing a textile, self-wrapping sleeve in accordance with yet another aspect of the invention.

As illustrated in FIG. 3, upon forming the textile wall 12 with the interlaced yarns 16, whether using a braiding, knitting or weaving apparatus, the layer 22 is formed on the outer surface 15 of the wall 12. The layer 22 is initially applied as a liquid coating, such as by spraying, brushing, dipping or roll coating, for example, onto the outer surface 15 of the wall 12. As shown in FIG. 2A, a layer 22' can also be formed to cover the inner surface 17, particularly if a dipping process is used to apply the liquid coating to the interlaced yarns 16. The liquid coating is provided as a fluorocarbon polymer, such as fluorinated ethylene propylene (FEP), and can be purchased under the name EterniTex 67-002/D8436 from Whitford Corporation out of Elverson, Pa. The liquid coating has a content of about 65% fluorine and about a 18-22% polymeric solid content by weight. Upon applying the liquid coating to the outer surface 15, the liquid coating is cured by application of heat. The heat imparted is sufficient to cause the polymer particles in the liquid coating to melt and coalesce, thereby converting the liquid coating to form the continuous thin film or layer 22 on the outer surface 15. Preferably, the coating is cured during the heating process used to heat-set the PPS yarns 16 in the wall into their self-curling configuration. As such, the liquid coating is cured to form the layer 22 on the outer surface 15 as an impervious barrier to liquid in the same heating process and at the same temperature used to form the wall 12 into a self-curling substrate. Accordingly, the manufacturing process used to form the self-curling sleeve 10 is economical. Upon curing the liquid coating, the layer 22, forming an impervious barrier, completely fills the interstices 32 and extends radially outwardly from the outer surface 15, thereby providing the wall 12 with its ability to protect the cavity 20 against the ingress of liquid. In addition, with the layer 22 extending radially outwardly from the interlaced yarns 16, the layer 22 provides complete circumferential protection to the yarns 16 of the wall 12 against abrasion. Although completely filling the interstices 32, the layer 22 can be formed to stop short of reaching the inner surface 17, and thus, the inner surface 17 can be formed free or substantially free of the layer 22. Otherwise, as shown in FIG. 2A, the layer 22 can also be formed to extend flush with or extend past the inner surface 17, thereby covering the inner surface 17 and completely encapsulating the interlaced yarns 16, if desired.

Obviously, many modifications and variations of the present invention are possible in light of the above teachings. It is, therefore, to be understood that within the scope of the appended claims, the invention may be practiced otherwise than as specifically described.

What is claimed is:

1. A method of constructing a self-wrapping, textile sleeve for routing and protecting elongate members, comprising:
   forming an interlaced textile wall having interstices extending between opposite outer and inner surfaces;
   applying a liquid coating to the entirety of the outer surface;
   heat forming the wall into a self-wrapping configuration at one temperature with the inner surface providing a tubular cavity; and
   curing the liquid coating at the one temperature during the heat forming step.

2. The method of claim 1 further including converting the liquid coating to form an impervious layer on the outer surface during the curing step.

3. The method of claim 2 further including filling the interstices with the impervious layer and forming the impervious layer on the inner surface.

4. The method of claim 2 further including leaving the inner surface substantially free of said impervious layer.

5. The method of claim 1 further including providing the liquid coating as a fluorocarbon polymer.

6. The method of claim 1 further including weaving the wall.

7. The method of claim 1 further including braiding the wall.

8. The method of claim 1 further including knitting the wall.

* * * * *